Sept. 3, 1968  G. V. SPRAGUE, JR  3,399,665
APPARATUS FOR MELTING AND DISPENSING THERMOPLASTIC MATERIAL
Filed May 24, 1967  2 Sheets-Sheet 1

Inventor
Gordon V. Sprague, Jr.
By his Attorney
George C. Fuller

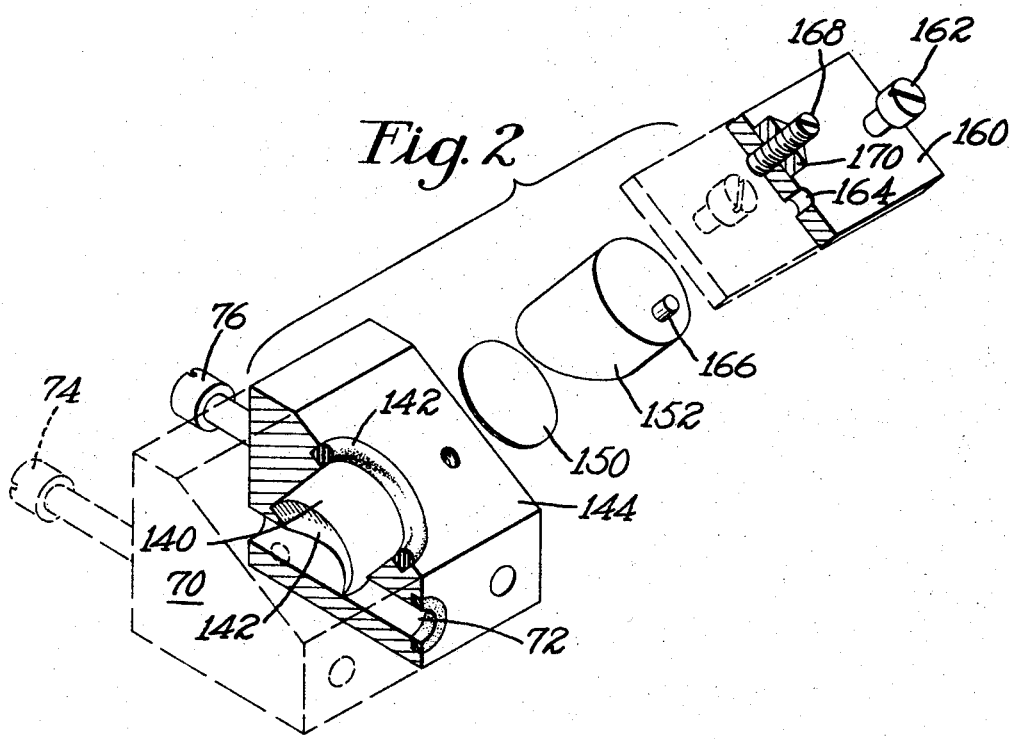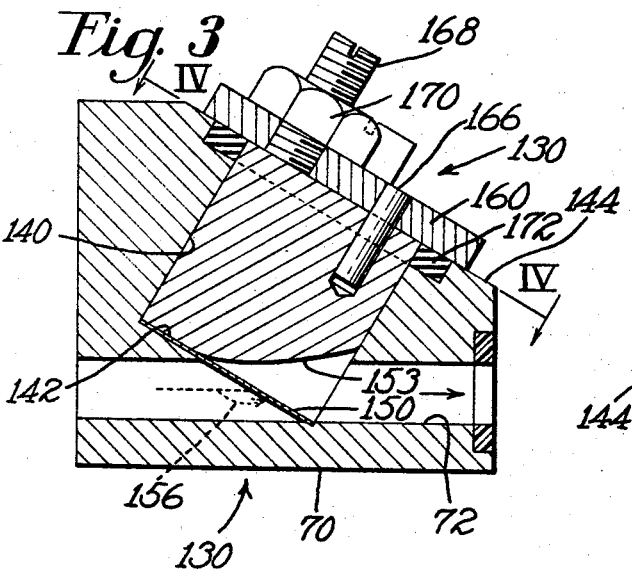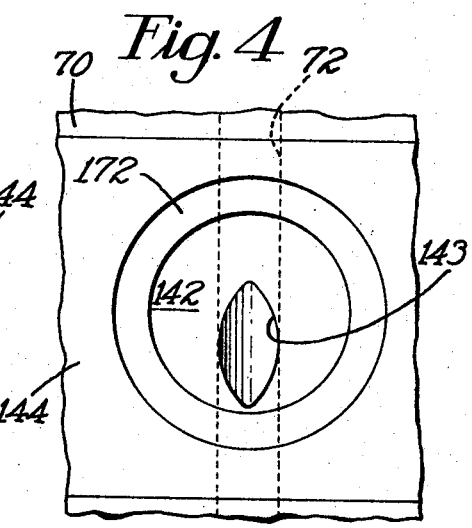

United States Patent Office 3,399,665
Patented Sept. 3, 1968

3,399,665
APPARATUS FOR MELTING AND DISPENSING THERMOPLASTIC MATERIAL
Gordon V. Sprague, Jr., Danvers, Mass., assignor to United Shoe Machinery Corporation, Flemington, N.J., a corporation of New Jersey
Filed May 24, 1967, Ser. No. 640,970
4 Claims. (Cl. 126—343.5)

ABSTRACT OF THE DISCLOSURE

Apparatus for melting and dispensing thermoplastic material supplied in the form of a rod comprises a heated melt body having a melt chamber and a heated passageway formed with an inlet passage provided with valve means for closure of the inlet passage during idle periods to prevent "blow-back" of molten material through the inlet. The valve means includes a valve member resiliently movable for opening the passage by pressure of the leading end of a rod for admission thereof to the melt chamber. The valve member suitably comprises a resilient disc normally seated oblique to said passage and adapted to cut through a heat softened rod for seating and closure of the inlet passage.

Background of the invention

This invention relates to apparatus for melting and dispensing molten thermoplastic material and is herein illustrated as embodied in apparatus of the type shown in U.S. application Ser. No. 600,460, filed Dec. 9, 1966, in the name of Roland B. Lessard, for melting thermoplastic material supplied in the form of a rod. That invention provided among other advantages over the prior art a reduction in the loss of molten material during idle periods by extrusion through the discharge nozzle and back along the inlet passage, rearward extrusion through the inlet aperture being referred to as "blow-back." However, sufficient loss of material through "blow-back" still existed to constitute excessive waste.

Summary of the invention

It is an object of this invention to provide in apparatus of the foregoing type for melting and dispensing thermoplastic material supplied in the form of a rod means for eliminating the wastage of the thermoplastic material through "blow-back."

To this end and in accordance with a feature of the present invention, the herein illustrated apparatus, which has a heated melt body formed with a melt chamber, a rod admitting block formed with an inlet passage and means for feeding the leading end of a rod of thermoplastic material through the inlet passage, is provided with valve means carried by the melt body in operative relation with the inlet passage for closure thereof, when during idle periods rod is not being fed, to prevent the flow of molten material in a direction opposite to the movement of the rod during feeding.

In accordance with a further feature of the present invention, the valve means comprises a valve member normally closing the inlet passage and resiliently movable by the end of a rod of said thermoplastic material in being fed by said feeding means for opening the passage to admit said material to the melt chamber.

In accordance with yet another feature of the present invention, the valve member comprises a disc of resilient material, the disc being normally supported in seating relation against a flat surface formed on said passageway and obliquely intercepted by said inlet passage. The disc is supported for resilient movement away from said surface by the end of a rod being fed and is adapted for cutting through the rod as it is heat softened during idle periods.

The above and other objects and features of the invention will best be understood from the following description taken together with the accompanying drawings and will be pointed out in the claims.

Brief description of the drawings

In the drawings:
FIG. 2 is an exploded angular view on an enlarged scale of a portion of the apparatus shown in FIG. 1;
FIG. 3 is a vertical section on a further enlarged scale of apparatus shown in FIG. 2 and;
FIG. 4 is a detail view with parts removed (but not in section), normal to the line IV—IV of FIG. 3.

Figure 1:
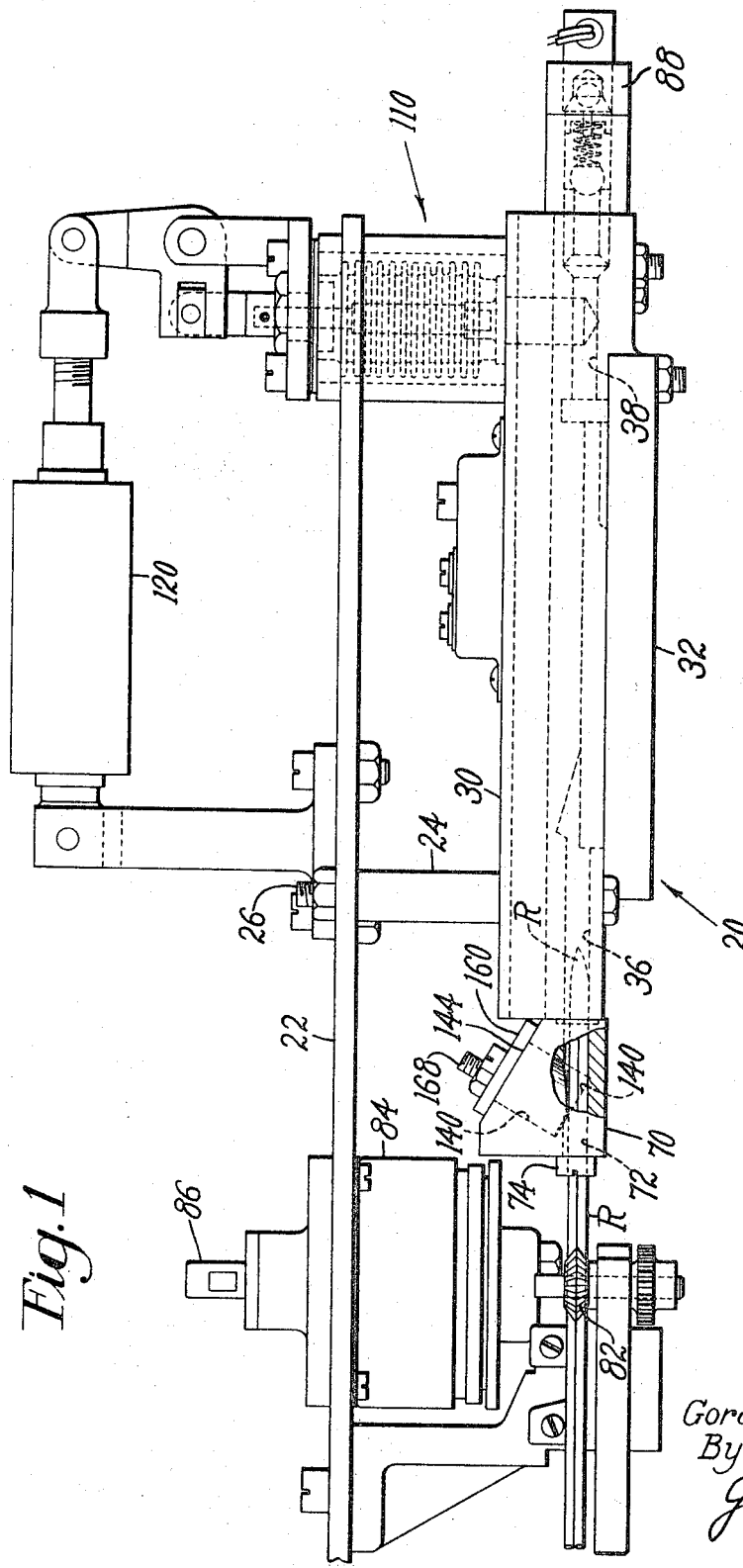
FIG. 1 is a plan view of melting and feeding apparatus embodying the features of this invention.

Referring to the drawings, and particularly to FIG. 1, the apparatus shown therein by way of illustration of an embodiment of the present invention is described in detail in the aforementioned application Ser. No. 600,460 to which reference may be made. Accordingly, only so much of the apparatus will herein be described in detail as is necessary to an understanding of the present invention. Thus the apparatus comprises a melt body indicated generally by the reference character 20 which is mounted on a main supporting plate 22 by means of spacer blocks 24 and bolts 26. The melt body comprises a main portion 30 and a cover 32. Formed in the main body portion is an inlet passage 36 and an outlet passage 38.

A rod admitting member in the form of a block, generally indicated by the reference numeral 70 and providing a passageway formed with an inlet passage 72, is fastened against the left-hand end of the melt body 20 by bolts 74 and 76 (FIG. 2) with the inlet passage 72 in axial alignment with the passage 36 and communicating with the melt chamber formed in the body 20 above the cover 32 as seen in FIG. 1.

A rod feed mechanism is provided in advance of the rod admitting block 70 and includes a pair of feed wheels, one of which is shown in the drawings (FIG. 1), and indicated by the reference numeral 82, and a magnetic clutch indicated by reference numeral 84 and having an input shaft 86 connected to a suitable source of power, not shown.

When this apparatus is in use, the input shaft will be driven continuously and upon energization of the clutch 84, as by the closing of a treadle switch, not shown, the feed wheels will be driven and the leading end of the rod R will be fed through the rod admitting block 70 and into the melt body 20 where it will be melted and molten adhesive will be forced out through the outlet passage 38 to a nozzle 88.

The apparatus also includes an arrangement comprising bellows means indicated generally by the reference numeral 110 operated by a cylinder 120 in response to the actuation of the treadle switch for the purposes disclosed in the aforesaid application.

To avoid "blow-back" of molten adhesive the rod admitting block 70 is provided with valve means indicated generally by the numeral 130 (FIG. 3) for preventing the flow of molten material in a reverse direction, that is, opposite to the direction of rod feed shown by the arrow in FIG. 3. For this purpose a cylindrical bore 140 (shown in concave half section in FIG. 2) is formed in the admitting block 70. The bottom of the bore 140 is essentially flat having a surface 142 which obliquely intersects the passageway 72. The intersection results in a generally "lip-shaped" or elliptical periphery of the opening 143 (FIG. 4). The bore 140 extends from the upper face 144 of the rod admitting block 70 which is parallel to the surface 142. The surface 142 is best seen in FIG. 4 looking down the bore 142.

A circular disc 150 of resilient material is supported against the flat surface 142 by a plug 152 which clamps the disc 150 against the surface 142 in an upper sector thereof as indicated in FIG. 3. The lower portion of the plug 152 is formed with a surface 153 curving upwardly with respect to the axis of the plug to afford room for the disc 150 to move away from the surface 142 when urged by pressure of the end of a rod of thermoplastic material as the rod passes through the opening 143. Sufficient room is thus provided when the disc is displaced from the surface 142 for the opening 143 in the inlet passage 72 to be substantially uninterrupted by the disc. The oblique seating of the disc 150 permits admission of a rod into the passage 36 without excessive bending of the disc. The greater the angle 156 (FIG. 3), measured between the axis of the passage 72 and the lower surface of the disc, the larger the disc must be to cover the opening 143. A suitable value for the angle 156 is about 150°. At the same time it will be seen that during idle periods when a rod of thermoplastic material is not being fed through the inlet aperture, the lower edge of the disc 150 will press against the rod. Since the rod admitting block 70 is in thermal communication with the melt body 20, the portion of the rod within the inlet passage 72 will become heat softened. As it does so, the relatively sharp lower edge of the disc 150 will cut through the rod and in seating against the surface 140, close the opening 143 in the inlet passage 72 against escape of molten material out of the inlet aperture.

For retaining the plug 152 in the aforesaid clamping disposition, a cover 160 is provided which is held over the plug and to the block 70 by screws 162. The cover 160 is provided with a hole 164 for receiving a locating dowel 166 on the plug. Threaded through the cover is a screw 168 adapted to exert pressure on the plug for clamping the edge of the disc 150 to the surface 142, the screw having a lock nut 170 for retaining its clamping position with an annular seal 172 between the passageway and the cover 160.

Having thus described my invention, what I claim as new and desire to secure by Letters Patent of the United States is:

1. Apparatus for melting and dispensing molten thermoplastic material supplied in the form of a rod, comprising a heated melt body formed with a melt chamber, rod admitting means formed with an inlet passage communicating with said melt chamber, and means for feeding the leading end of a rod of thermoplastic material through the inlet passage to supply the material to the melt chamber, in combination therewith, check valve means carried by said rod admitting means and operable for closing the inlet passage to prevent the flow of molten material through said inlet passage in a reverse direction.

2. Apparatus as in claim 1 wherein said valve means comprises a valve member disposed in said rod admitting means and normally closing said inlet passage, said valve member being resiliently movable by the end of a rod of said thermoplastic material being fed by said feeding means for opening the passage to admit said material to the melt chamber.

3. Apparatus as in claim 1 wherein said valve means comprises a valve member disposed in said rod admitting means and normally closing said inlet passage, said valve member comprising a disc of resilient material, said disc being supported for normal seating against a flat surface formed in said rod admitting member and obliquely intersected by said inlet passage for resilient movement away from said surface by the end of a rod being fed along said passage, said disc being adapted to cut through a stationary heat-softened rod for closing the inlet passage during idle periods of the apparatus.

4. Apparatus as in claim 3 in which said flat surface is disposed at an angle of about 150° to the axis of said inlet passage.

References Cited
UNITED STATES PATENTS

| | | | |
|---|---|---|---|
| 2,995,159 | 8/1961 | Berggren | 222—146 X |
| 3,097,380 | 7/1963 | Quinn | 219—421 X |
| 3,318,481 | 5/1967 | Phillips et al. | 222—56 |

CHARLES J. MYHRE, *Primary Examiner.*